US012607770B2

(12) United States Patent
Liu et al.

(10) Patent No.: US 12,607,770 B2
(45) Date of Patent: Apr. 21, 2026

(54) LOGGING IDENTIFICATION METHOD FOR SMALL FAULT BASED ON STRESS ANISOTROPY AND CRUSTAL STRESS TYPES

(71) Applicant: CHINA UNIVERSITY OF GEOSCIENCES (WUHAN), Wuhan (CN)

(72) Inventors: Jingshou Liu, Wuhan (CN); Chuanbo Shen, Wuhan (CN); Lianfu Mei, Wuhan (CN); Hui Zhang, Wuhan (CN); Ke Xu, Wuhan (CN); Zhonghu Wu, Wuhan (CN); Ruyue Wang, Wuhan (CN); Wenlong Ding, Wuhan (CN); Haimeng Yang, Wuhan (CN); Hejuan Liu, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 384 days.

(21) Appl. No.: 18/315,458

(22) Filed: May 10, 2023

(65) Prior Publication Data

US 2024/0085587 A1 Mar. 14, 2024

(30) Foreign Application Priority Data

Sep. 13, 2022 (CN) .......................... 202211107809.5

(51) Int. Cl.
*G01V 20/00* (2024.01)
*E21B 49/00* (2006.01)

(52) U.S. Cl.
CPC .............. *G01V 20/00* (2024.01); *E21B 49/00* (2013.01); *E21B 2200/20* (2020.05)

(58) Field of Classification Search
CPC .......... G01V 20/00; G01V 1/40; E21B 49/00; E21B 2200/20
See application file for complete search history.

(56) References Cited

U.S. PATENT DOCUMENTS

| | | |
|---|---|---|
| 8,923,094 B2 | 12/2014 | Jing et al. |
| 10,502,863 B2 | 12/2019 | Mosse et al. |
| 11,378,717 B2 | 7/2022 | Thore et al. |

OTHER PUBLICATIONS

Pandey, et al. Addressing Type-II Overpressure and Comprehensive 1-D Mechanical Earth Modeling in a Tectonically Active Area in Tripura Fold Belt of India: A Case Study, (2020), 13th Biennial International Conference and Exhibition, Kochi 2020, Society of Petroleum Geophysicists, India, 1-6 (Year: 2020).*

* cited by examiner

*Primary Examiner* — Catherine T. Rastovski
*Assistant Examiner* — Emma Alexander
(74) *Attorney, Agent, or Firm* — True Shepherd LLC; Andrew C. Cheng

(57) ABSTRACT

In a logging identification method for a small fault based on stress anisotropy and crustal stress types, a magnitude and direction of a current crustal stress are determined by means of logging calculation of the crustal stress, and a transformation location of a crustal stress type is determined; a development location of the small fault is determined according to the transformation location of the crustal stress type; and an included angle between the current crustal stress and the fault is determined according to an amplitude of variation of stress anisotropy. The present disclosure provides the logging identification method for a small fault based on stress anisotropy and crustal stress types. According to the method, prediction cost is low, operability is high, and a prediction result has a reference value for guiding
(Continued)

Carry out logging calculation on a current crustal stress — 1

Calculate anisotropy of the current crustal stress — 2

Determine a direction of the current crustal stress — 3

Determine a transformation location of a crustal stress type — 4

Determine a development location and strike of a small fault — 5 exploration and development of a complex oil and gas reservoir and construction of a gas storage.

2 Claims, 7 Drawing Sheets

LOGGING IDENTIFICATION METHOD FOR SMALL FAULT BASED ON STRESS ANISOTROPY AND CRUSTAL STRESS TYPES

CROSS-REFERENCE TO RELATED APPLICATIONS

This application claims priority to Chinese Patent Application No. 202211107809.5 with a filing date of Sep. 13, 2022. The content of the aforementioned application, including any intervening amendments thereto, is incorporated herein by reference.

TECHNICAL FIELD

The present disclosure relates to the field of exploration and development of oil and gas fields, and in particular to a logging identification method for a small fault based on stress anisotropy and crustal stress types.

BACKGROUND

Complex fault block oil fields are widely distributed in China. Faults with complex structures are developed in fault block oil and gas reservoirs, in which fault systems are complex. Specifically, different grades of faults control formation and distribution of oil and gas in the fault block oil fields. High-grade faults control a structural trend and occurrence of fault blocks, thereby further controlling formation and accumulation of oil and gas. Small faults further complicate the fault block oil fields, and function as a crucial control factor in enrichment of remaining oil. From a perspective of a reservoir geology model, it is deemed that the biggest difference between medium-and-high permeability complex fault block oil fields and an integrated high permeability oil field lies in densities of faults and sizes of fault blocks. Therefore, a combination of the faults and division of the fault blocks are crucial to geological modeling of the medium-and-high permeability complex fault block oil fields. In the combination of the faults, the high-grade faults are easier to identify and combine than the small faults. Fine geological modeling of complex fault block oil reservoirs are based on identification, description, and combination of the small faults. Accuracy of interpretation of the small faults is closely tied to a small scale, strong concealment, and difficulty in earthquake identification of the small faults. Currently, there are few techniques for predicting the small faults. In view of that, a method, which can accurately identify development locations and distribution of the small faults, is urgently needed.

SUMMARY OF PRESENT INVENTION

The objective of the present disclosure is to provide a logging identification method for a small fault based on stress anisotropy and crustal stress types, which may accurately determine a development location and strike of the small fault.

The technical solution of the present disclosure is as follows: a logging identification method for a small fault based on stress anisotropy and crustal stress types includes:

Step 1, carrying out logging calculation on a current crustal stress:

calculating a horizontal principal stress with logging data:

$$S_{Hmax} = \frac{v}{1-v}\sigma_v - \frac{v}{1-v}\alpha P_p + \alpha P_p + \frac{E}{1-v^2}\varepsilon_y + \frac{vE}{1-v^2}\varepsilon_x \qquad (1)$$

$$S_{hmin} = \frac{v}{1-v}\sigma_v - \frac{v}{1-v}\alpha P_p + \alpha P_p + \frac{E}{1-v^2}\varepsilon_x + \frac{vE}{1-v^2}\varepsilon_y \qquad (2)$$

where in equations (1)-(2), $S_{hmin}$ and $S_{Hmax}$ indicate a minimum horizontal principal stress and a maximum horizontal principal stress respectively, in MPa, $v$ indicates a static Poisson's ratio, $\sigma_v$ indicates an overburden pressure, in MPa, $\alpha$ indicates a Biot's elastic coefficient, and is dimensionless, $P_p$ indicates a pore pressure, in MPa, E indicates a static Young's modulus, in MPa, $\varepsilon_x$ and $\varepsilon_y$ indicate strains in directions of the minimum horizontal principal stress and the maximum horizontal principal stress respectively, and are dimensionless, and $\varepsilon_x$ and $\varepsilon_y$ are mainly configured to characterize an additional horizontal crustal stress caused by a tectonic stress, and are dimensionless;

Step 2, calculating stress anisotropy:

$$K_h = \frac{S_{Hmax} - S_{hmin}}{S_{hmin}} \qquad (3)$$

establishing, according to equation (3), a stress anisotropy index $K_h$ to calculate the stress anisotropy:

where in equation (3), $S_{hmin}$ and $S_{Hmax}$ indicate a minimum horizontal principal stress and a maximum horizontal principal stress respectively, in MPa; and the stress anisotropy is calculated with equation (3) in a vertical direction;

Step 3, determining a direction of the current crustal stress:

determining the direction of the current crustal stress in the vertical direction by integrating borehole wall collapse, hole deviation, induced fractures and an orientation of fast shear waves;

Step 4, determining a transformation location of a crustal stress type:

identifying, according to a determined magnitude and direction of the current crustal stress, the crustal stress type to determine the transformation location of the crustal stress type, where the crustal stress type includes a strike-slip stress field, a thrust stress field and a normal fault stress field; and Step 5, determining a development location and strike of the small fault:

determining the development location of the small fault according to the transformation location of the crustal stress type, and determining an included angle between the current crustal stress and the fault according to an amplitude of variation of the stress anisotropy. The determining the development location of the small fault according to the transformation location of the crustal stress type includes: determining a development location of a reverse fault on the basis that the transformation location of the crustal stress type occurs in an upthrown side of the reverse fault under the condition that a research area is a reverse fault development area; and determining a development location of a normal fault on the basis that the transformation location of the crustal stress type occurs in a downthrown side of the normal fault under the condition that the research area is a normal fault development area. determining the strike of the fault on the basis that the fault intersects with the direction of the current crustal stress at an acute angle at a location in which the stress anisotropy is increased and the fault intersects with the direction of the current crustal stress at an obtuse angle at a location in which the stress anisotropy is reduced; and establishing, by building geomechanical models of the fault in different directions, a quantitative relation between an included angle between the strike of the fault and a direction of the horizontal principal stress and the stress anisotropy index, to accurately determine the strike of the fault.

The present disclosure has the beneficial effects: the magnitude and direction of the current crustal stress are determined by means of logging calculation of the crustal stress, and the transformation location of the crustal stress type is determined; the development location of the small fault is determined according to the transformation location of the crustal stress type; and the included angle between the current crustal stress and the fault is determined according to the amplitude of variation of the stress anisotropy. Research results have a reference value for identifying the small fault in a complex fault block reservoir. The patent of the present disclosure provides the logging identification method for a small fault based on stress anisotropy and crustal stress types. According to the method, prediction cost is low, operability is high, expenditures of human and financial resources may be may be greatly reduced, and a prediction result has a reference value for guiding exploration and development of a complex oil and gas reservoir and construction of a gas storage.

DETAILED DESCRIPTION OF THE EMBODIMENTS

The specific implementation of the present disclosure will be described below with reference to the accompanying drawings.

Figure 1:
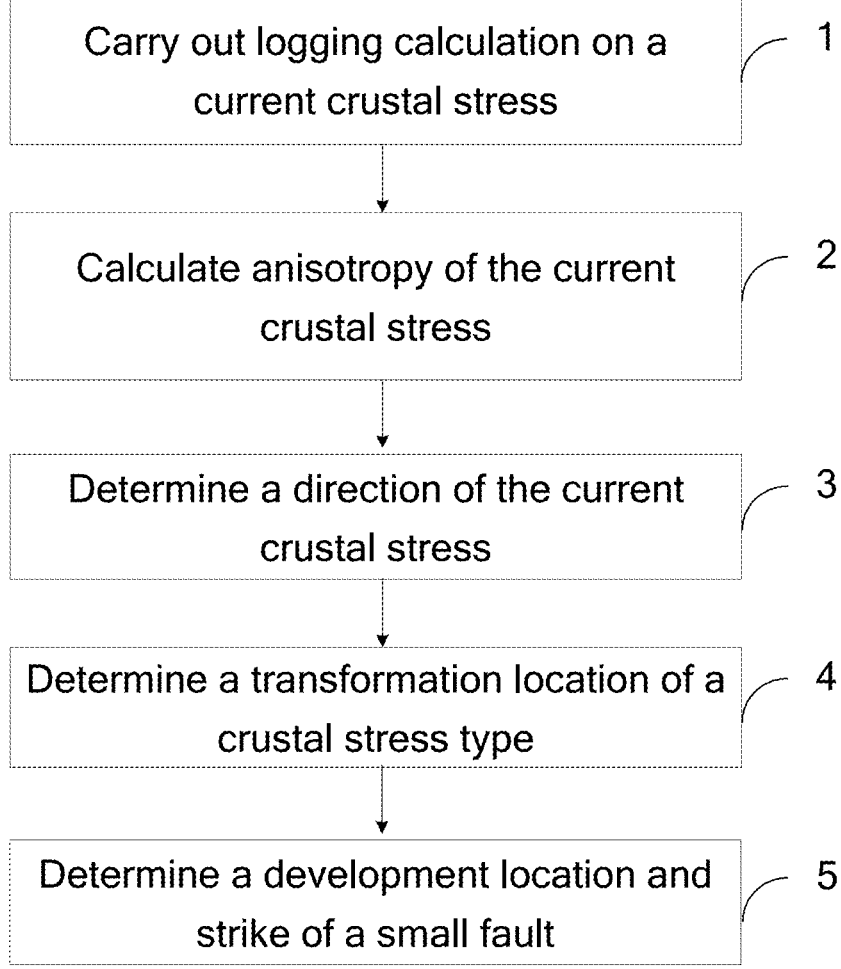
FIG. 1 is a flowchart of a logging identification method for a small fault based on stress anisotropy and crustal stress types in an embodiment of the present disclosure.
Figure 2:
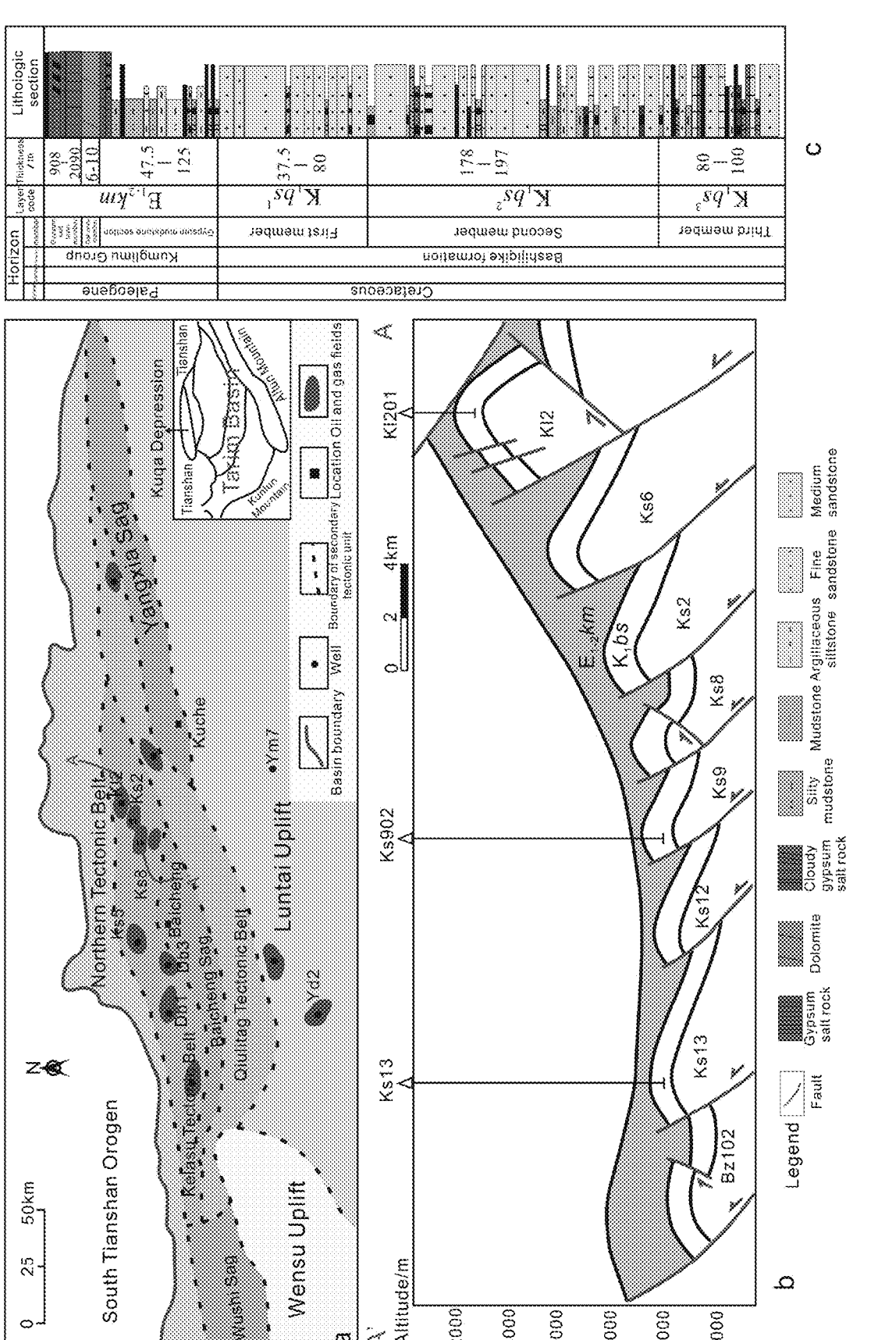
FIG. 2 is a diagram of tectonic features of a research area and a stratigraphic structure of a target stratum in an embodiment of the present disclosure, where (a) is a tectonic location of the Kelasu tectonic belt, (b) is a near-north-south geological section of Kuche depression, and (c) is a stratigraphic structure of Bashijiqike Formation.

FIG. 1 is a specific implementation process of a logging identification method for a small fault based on stress anisotropy and crustal stress types. A Kelasu tectonic belt in a research area is located in the north of Kuche depression in Tarim Basin, is a thrust fold belt in a north east east-east west direction, features east-west segmentation and north-south zoning, is famous for strong compression and large deformation, and has an exploration area of about 4800 km². The Kelasu tectonic belt may be divided into Ks, Db, Bz, and Awat zones from east to west. The Kelasu tectonic belt has a complete oil and gas system, a deep to ultra-deep oil and gas have huge potential, and a Paleogene system is a regional enclosed gypsum salt rock stratum; and a southern part of the Kelasu tectonic belt is adjacent to a hydrocarbon generating sag, thrust nappe structural traps are developed in a Bashijiqike Formation of Lower Cretaceous, and reservoir-cap assemblages are well developed, which has excellent geological conditions for reservoir formation. A series of long imbricated anticlines are developed in a Bz-Db area of the research area in a north-south direction, and compressive strength is gradually weakened from north to south; and with a salt bed as a boundary, the Bz-Db area is divided into 3 tectonic strata in a longitudinal direction: a suprasalt tectonic stratum ($E_2s$-Q), a salt tectonic stratum ($E_{1-2}$ km) and a subsalt tectonic stratum (T-K). Under the action of the gypsum salt stratum, deformation of the salt stratum is mainly caused by faults and folds related to the fractures. The subsalt stratum forms a series of common mountain front tectonic styles such as anticlines, faulted anticlines and sudden structures, as well as common structural combinations such as dual structures, stacked structures, and wedge-shaped structures. The salt stratum forms salt related structures such as salt pillows and salt domes (FIG. 2).

Figure 3:
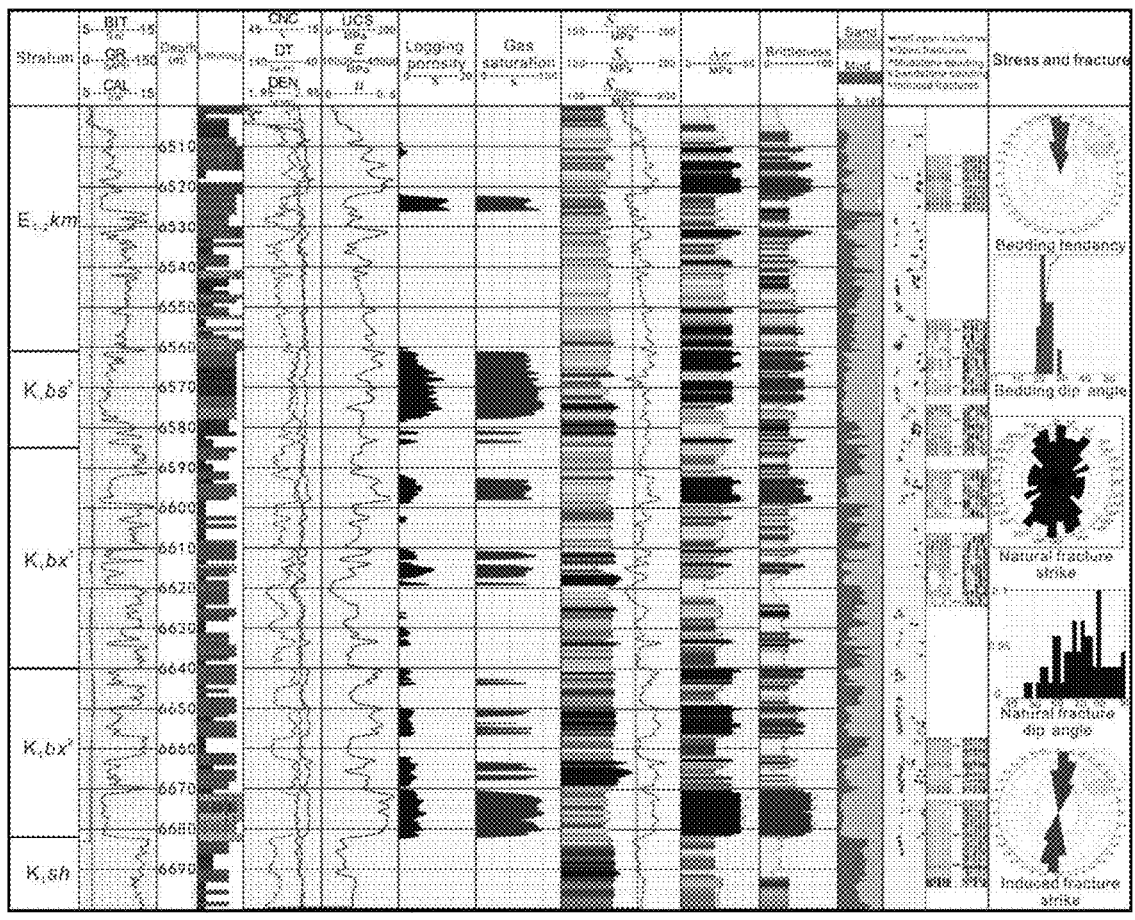
FIG. 3 shows logging interpretation of geomechanical parameters of a Bz 1203 in an embodiment of the present disclosure.

Step 1, carry out logging calculation on a current crustal stress:

calculate a horizontal principal stress with logging data:

$$S_{Hmax} = \frac{v}{1-v}\sigma_v - \frac{v}{1-v}\alpha P_p + \alpha P_p + \frac{E}{1-v^2}\varepsilon_y + \frac{vE}{1-v^2}\varepsilon_x \quad (1)$$

$$S_{h\,min} = \frac{v}{1-v}\sigma_v - \frac{v}{1-v}\alpha P_p + \alpha P_p + \frac{E}{1-v^2}\varepsilon_x + \frac{vE}{1-v^2}\varepsilon_y \quad (2)$$

where in equations (1)-(2), $S_{hmin}$ and $S_{Hmax}$ indicate a minimum horizontal principal stress and a maximum horizontal principal stress respectively, in MPa, $v$ indicates a static Poisson's ratio, $\sigma_v$ indicates an overburden pressure, in MPa, $\alpha$ indicates a Biot's elastic coefficient, and is dimensionless, $P_p$ indicates a pore pressure, in MPa, E indicates a static Young's modulus, in MPa, $\varepsilon_x$ and $\varepsilon_y$ indicate strains in directions of the minimum horizontal principal stress and the maximum horizontal principal stress respectively, and are dimensionless, and $\varepsilon_x$ and $\varepsilon_y$ are mainly configured to characterize an additional horizontal crustal stress caused by a tectonic stress, and are dimensionless. A calculation result is shown in FIG. 3.

Figure 4:
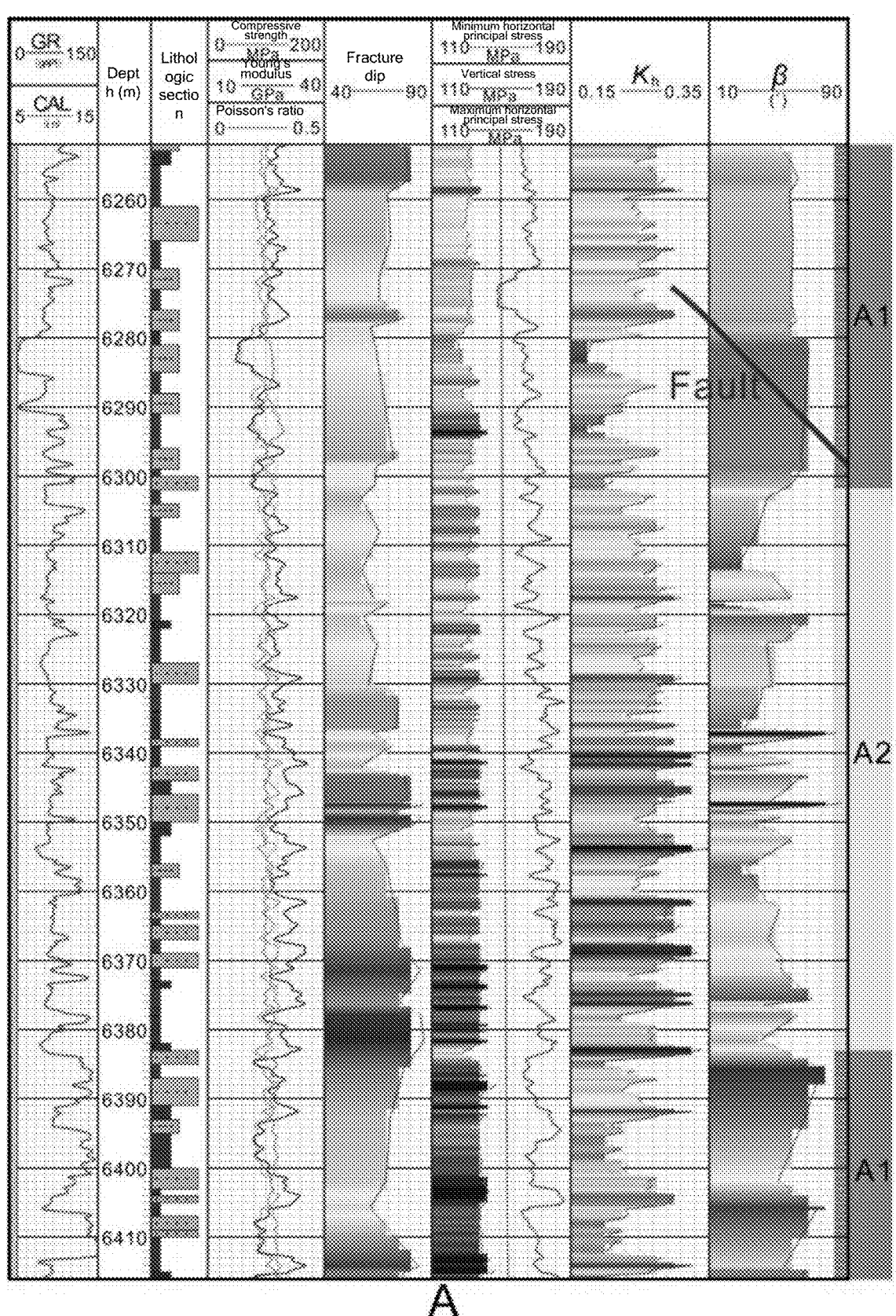
FIG. 4 shows image logging features of a Db 14 in an embodiment of the present disclosure.

Step 2, calculate stress anisotropy:

establish, according to equation (3), a stress anisotropy index $K_h$ to calculate the stress anisotropy:

$$K_h = \frac{S_{Hmax} - S_{hmin}}{S_{hmin}} \quad (3)$$

where in equation (3), $S_{hmin}$ and $S_{Hmax}$ indicate a minimum horizontal principal stress and a maximum horizontal principal stress respectively, in MPa; and the stress anisotropy is calculated with equation (3) in a vertical direction. A calculation result is shown in FIG. 4.

Figure 5:
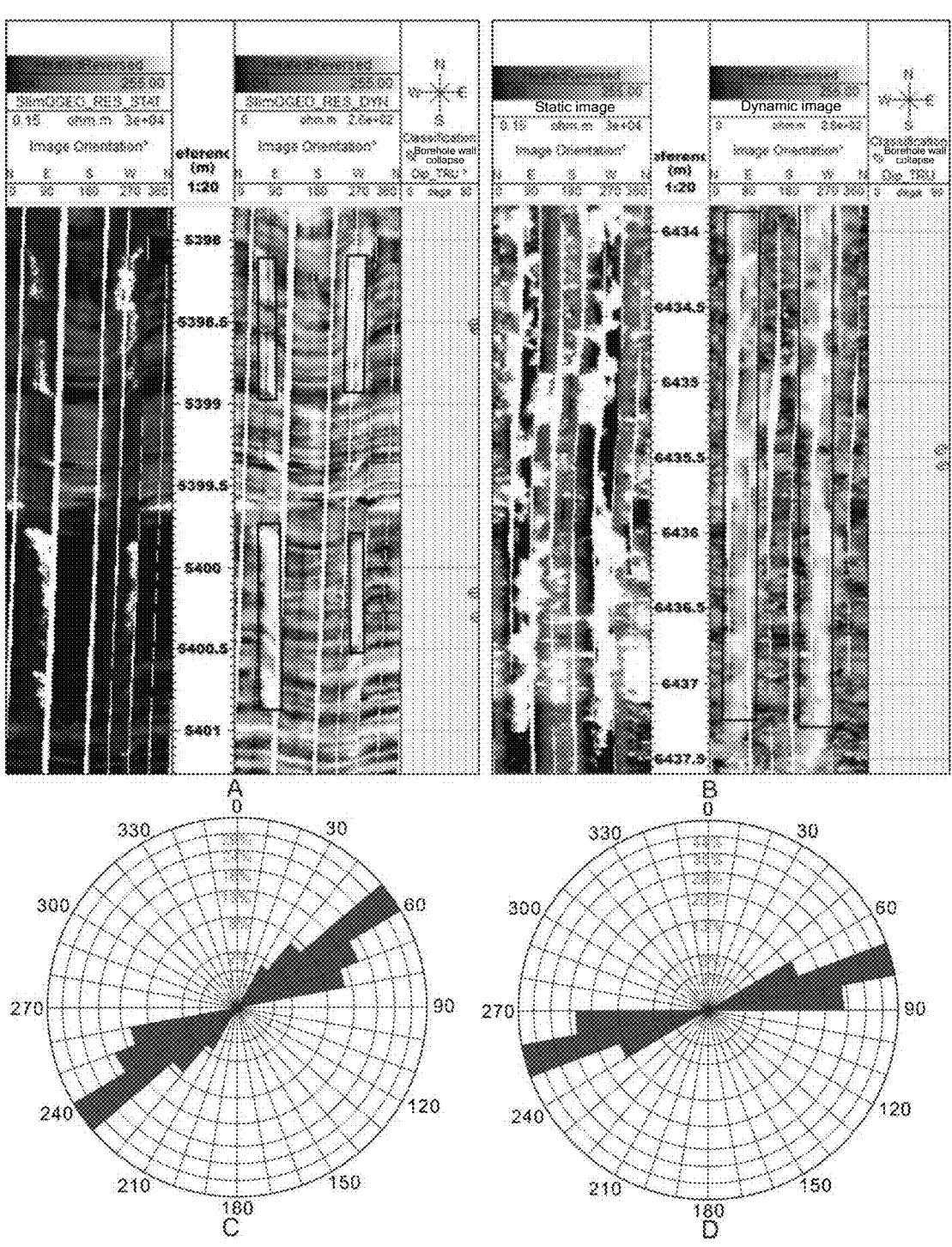
FIG. 5 shows image and strike features of borehole wall collapse of a Db14 in an embodiment of the present disclosure; and image and strike features of borehole wall collapse of a Db12.

Step 3, determine a direction of the current crustal stress:

determine the direction of the current crustal stress in the vertical direction by integrating borehole wall collapse, hole deviation, induced fractures and an orientation of fast shear waves. As shown in FIG. 5, borehole wall collapse is represented as two 180° symmetrical vertical long bright bands or blocks on an image, and an orientation of the borehole wall collapse is an orientation of a current minimum horizontal principal stress of the stratum. Analysis of a direction of a crustal stress of the Db 14 shows that a dominant orientation of borehole wall collapse is north east east-south west west. Therefore, it is determined that a direction of a current minimum horizontal principal stress of a measurement section of the well is north east east-south west west. The well has a low mud content, severe expansion of an entire well section, and no obvious development of drilling induced fractures, and therefore, it is determined that the direction of the maximum principal stress is north north west-south south east. A dominant orientation of borehole wall collapse in the Db 12 is also north east east-south east east. A maximum hole deviation in a development section of borehole wall collapse is less than 10 degrees, and therefore a direction of a current minimum horizontal principal stress in a measurement section in which a hole deviation of the well is less than 10 degrees is north east east-south east east.

Figure 6:
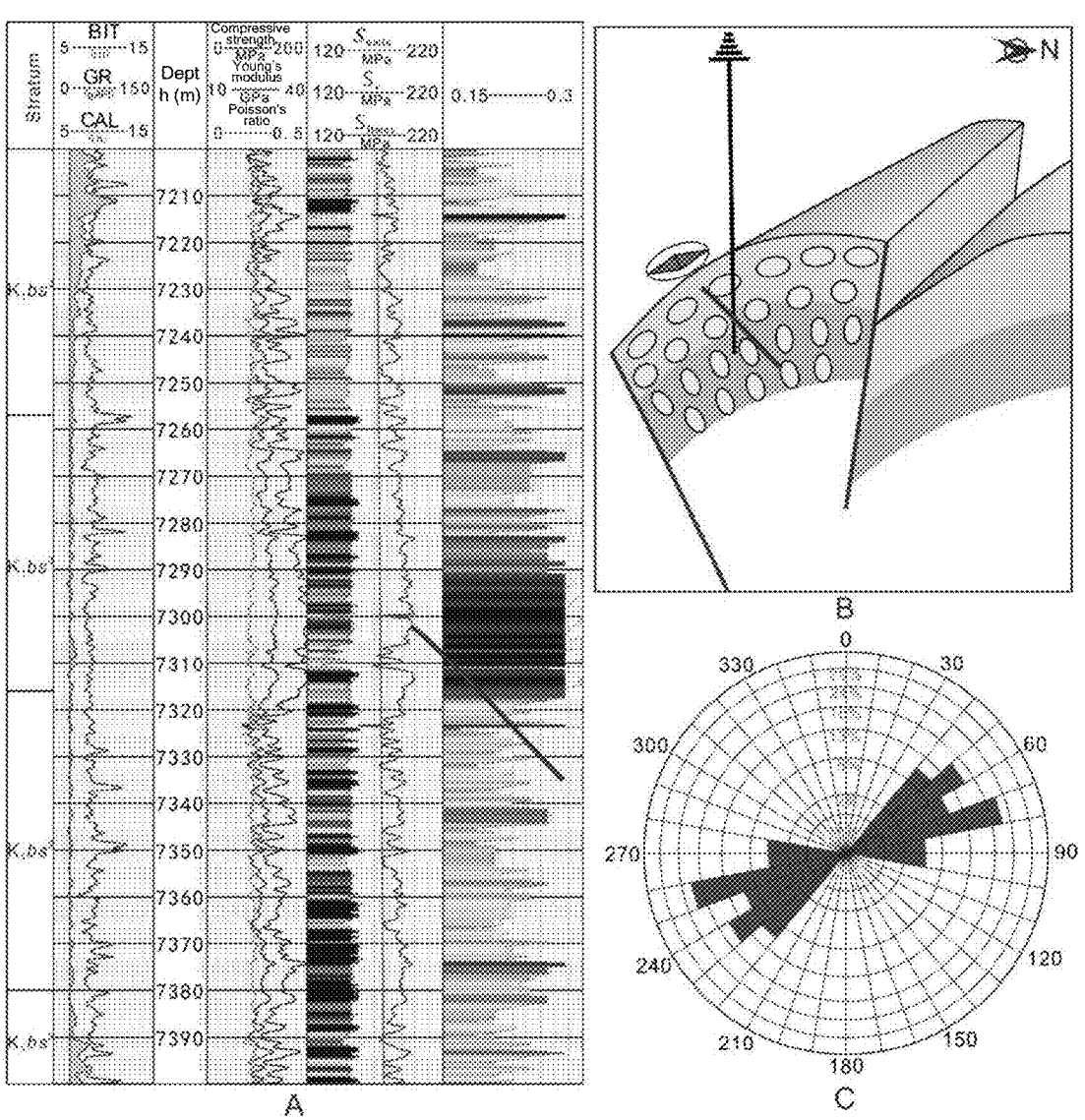
FIG. 6 shows stress distribution near a fault of a Bz 24 in an embodiment of the present disclosure.

Step 4, determine a transformation location of a crustal stress type:

identify, according to a determined magnitude and direction of the current crustal stress, the crustal stress type to determine the transformation location of the crustal stress type, where the crustal stress type includes a strike-slip stress field, a thrust stress field and a normal fault stress field. As shown in FIG. 6, at about 7310 m, a maximum horizontal principal stress and a minimum horizontal principal stress are both reduced, the maximum horizontal principal stress is less than or approximately equal to a vertical principal stress, and transformation of the crustal stress type occurs near the fault. That is, the crustal stress type is transformed from the strike-slip stress field to the normal fault stress field.

Step 5, determine a development location and strike of the small fault.

Figure 7:
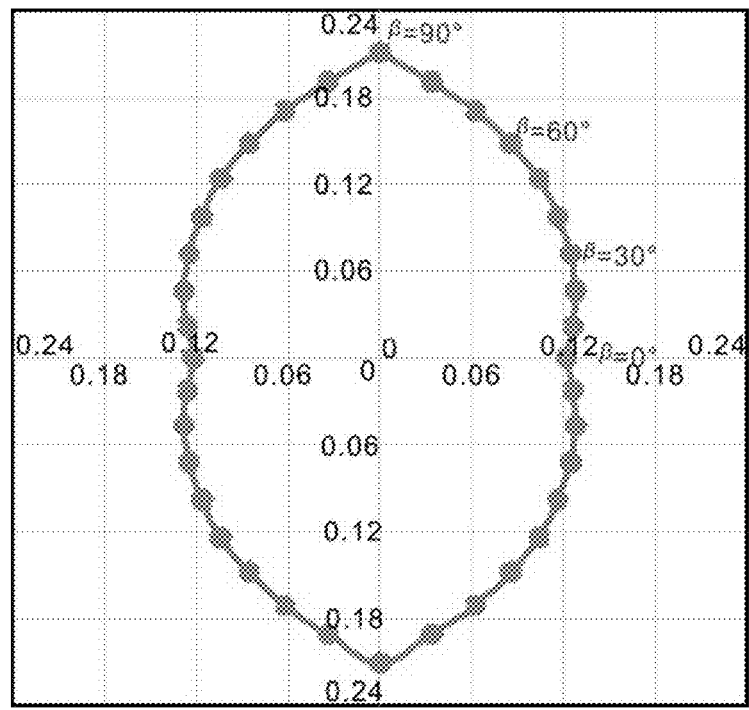
FIG. 7 shows a quantitative relation between an included angle between a strike of a fault and a direction of a horizontal principal stress and a stress anisotropy index in an embodiment of the present disclosure.

Geophysical data analysis shows that the fault will significantly change the type of the crustal stress and the stress anisotropy. In the Bz 24, according to stratigraphic repetition, it is determined that a fault is developed at about 7310 m, which is a north dipping reverse fault having a near-east-west strike. An orientation of an induced fracture in the research area is north east and east, and intersects with a direction of a current crustal stress at a low angle. In a hanging wall of the fault, the stress anisotropy is high, which is basically consistent with numerical simulation results. In combination with an amplitude of variation of the stress anisotropy index in FIGS. 7 and 6, it is determined that the strike of the fault is 75° north, east and east.

The present disclosure is illustrated by means of examples above, but it is not limited to the particular embodiments described above. Any modifications or variations made based on the present disclosure fall within the scope of protection of the present disclosure.

What is claimed is:

1. A logging identification method for a small fault based on stress anisotropy and crustal stress types, comprising:

step 1, carrying out logging calculation on a current crustal stress:

calculating a horizontal principal stress with logging data:

$$S_{Hmax} = \frac{v}{1-v}\sigma_v - \frac{v}{1-v}\alpha P_p + \alpha P_p + \frac{E}{1-v^2}\varepsilon_y + \frac{vE}{1-v^2}\varepsilon_x \quad (1)$$

$$S_{h\,min} = \frac{v}{1-v}\sigma_v - \frac{v}{1-v}\alpha P_p + \alpha P_p + \frac{E}{1-v^2}\varepsilon_x + \frac{vE}{1-v^2}\varepsilon_y \quad (2)$$

wherein in equations (1)-(2), $S_{hmin}$ and $S_{Hmax}$ indicate a minimum horizontal principal stress and a maximum horizontal principal stress respectively, in MPa, v indicates a static Poisson's ratio, $\sigma_v$ indicates an overburden pressure, in MPa, $\alpha$ indicates a Biot's elastic coefficient, and is dimensionless, $P_p$ indicates a pore pressure, in MPa, E indicates a static Young's modulus, in MPa, $\varepsilon_x$ and $\varepsilon_y$ indicate strains in directions of the minimum horizontal principal stress and the maximum horizontal principal stress respectively, and are dimensionless, and $\varepsilon_x$ and $\varepsilon_y$ are mainly configured to characterize an additional horizontal crustal stress caused by a tectonic stress, and are dimensionless;

step 2, calculating stress anisotropy:

establishing, according to equation (3), a stress anisotropy index $K_h$ to calculate the stress anisotropy:

$$K_h = \frac{S_{Hmax} - S_{hmin}}{S_{hmin}} \quad (3)$$

wherein in equation (3), $S_{hmin}$ and $S_{Hmax}$ indicate a minimum horizontal principal stress and a maximum horizontal principal stress respectively, in MPa; and the stress anisotropy is calculated with equation (3) in a vertical direction;

step 3, determining a direction of the current crustal stress:

determining the direction of the current crustal stress in the vertical direction by integrating borehole wall collapse, hole deviation, induced fractures and an orientation of fast shear waves;

step 4, determining a transformation location of a crustal stress type:

identifying, according to a determined magnitude and direction of the current crustal stress, the crustal stress type to determine the transformation location of the crustal stress type, wherein the crustal stress type comprises a strike-slip stress field, a thrust stress field and a normal fault stress field;

step 5, determining a development location and strike of the small fault:

determining the development location of the small fault according to the transformation location of the crustal stress type, and determining an included angle between the current crustal stress and the fault according to an amplitude of variation of the stress anisotropy;

wherein the determining an included angle between the current crustal stress and the fault according to an amplitude of variation of the stress anisotropy comprises:

determining the strike of the fault on the basis that the fault intersects with the direction of the current crustal stress at an acute angle at a location in which the stress anisotropy is increased and the fault intersects with the direction of the current crustal stress at an obtuse angle at a location in which the stress anisotropy is reduced; and establishing, by building geomechanical models of the fault in different directions, a quantitative relation between an included angle between the strike of the fault and a direction of the horizontal principal stress and the stress anisotropy index, to accurately determine the strike of the fault; and step 6, guiding exploration and development of a complex oil and gas reservoir and construction of a gas storage according to the development location of the fault and the strike of the fault.

2. The logging identification method according to claim 1, wherein the determining the development location of the small fault according to the transformation location of the crustal stress type comprises:

determining a development location of a reverse fault on the basis that the transformation location of the crustal stress type occurs in an upthrown side of the reverse fault under the condition that a research area is a reverse fault development area; and determining a development location of a normal fault on the basis that the transformation location of the crustal stress type occurs in a downthrown side of the normal fault under the condition that the research area is a normal fault development area.

\* \* \* \* \*